Oct. 18, 1966  J. O. TOMBLIN, JR  3,279,097
BOWLERS' SLIDE RULE
Filed April 16, 1964  6 Sheets-Sheet 1
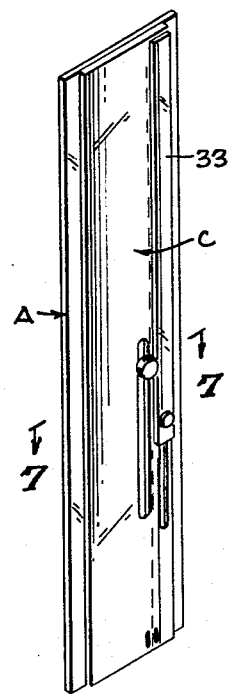
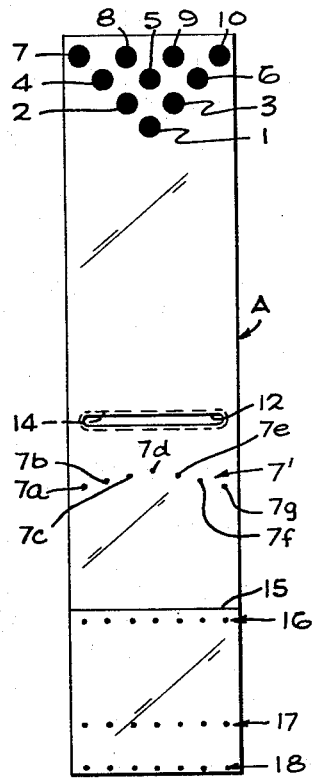
INVENTOR.
JOHN O. TOMBLIN, JR.
BY
ATTORNEY

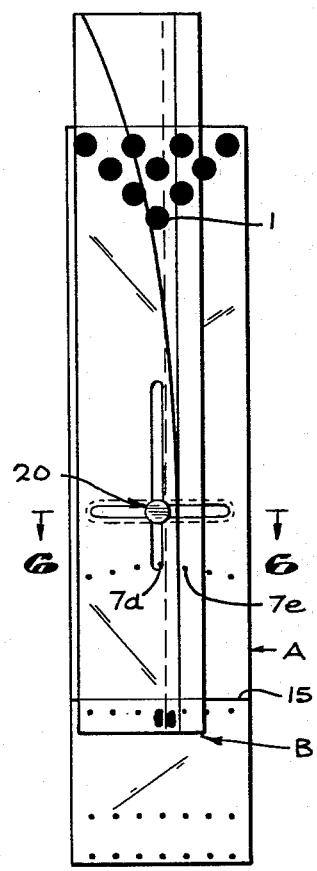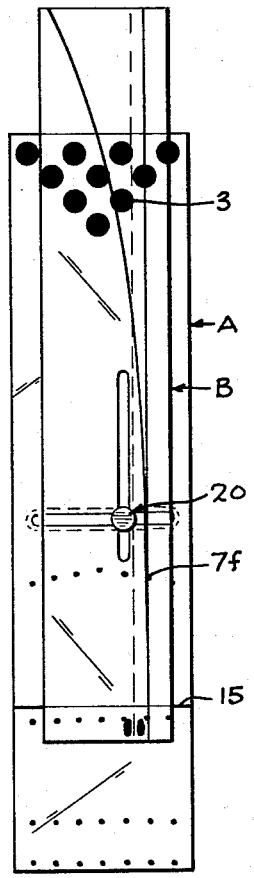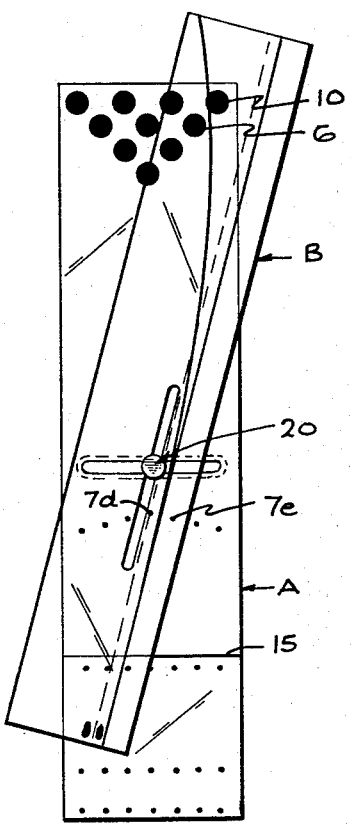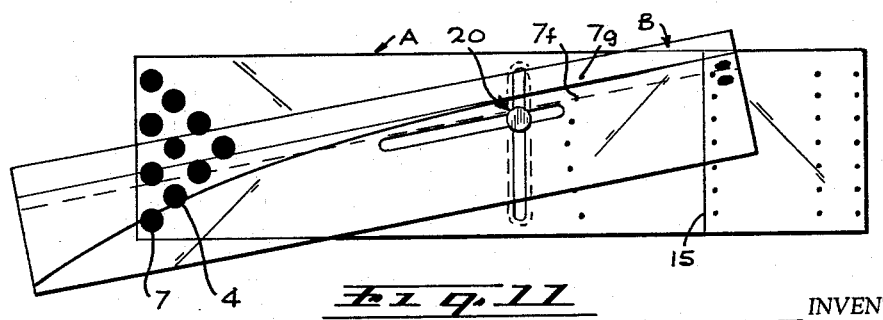

Oct. 18, 1966 J. O. TOMBLIN, JR 3,279,097
BOWLERS' SLIDE RULE
Filed April 16, 1964 6 Sheets-Sheet 3
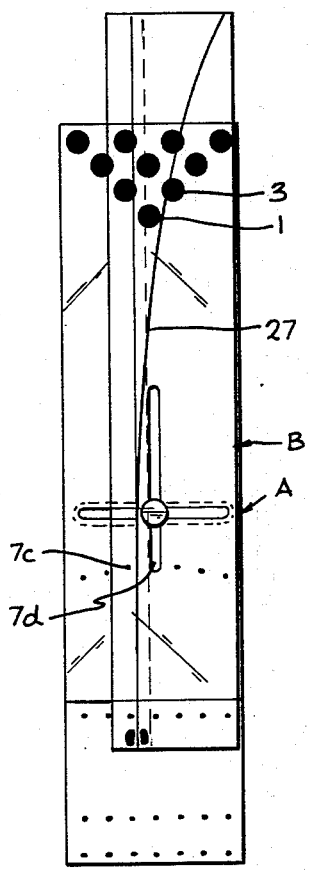
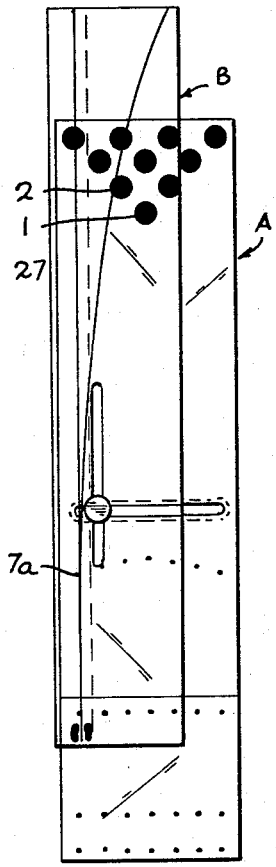
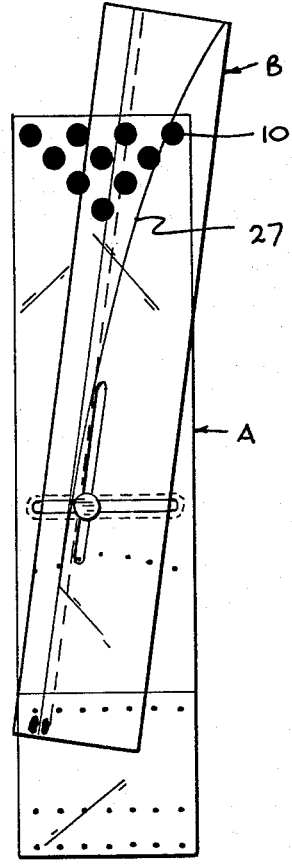
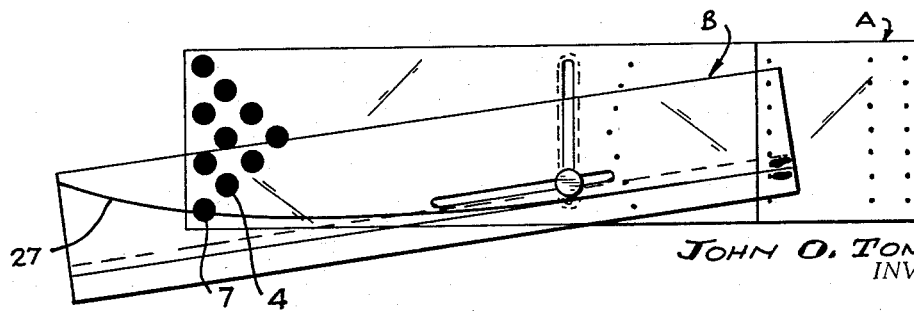
JOHN O. TOMBLIN, JR.
INVENTOR.
BY
ATTORNEY Oct. 18, 1966 J. O. TOMBLIN, JR 3,279,097
BOWLERS' SLIDE RULE
Filed April 16, 1964 6 Sheets-Sheet 4
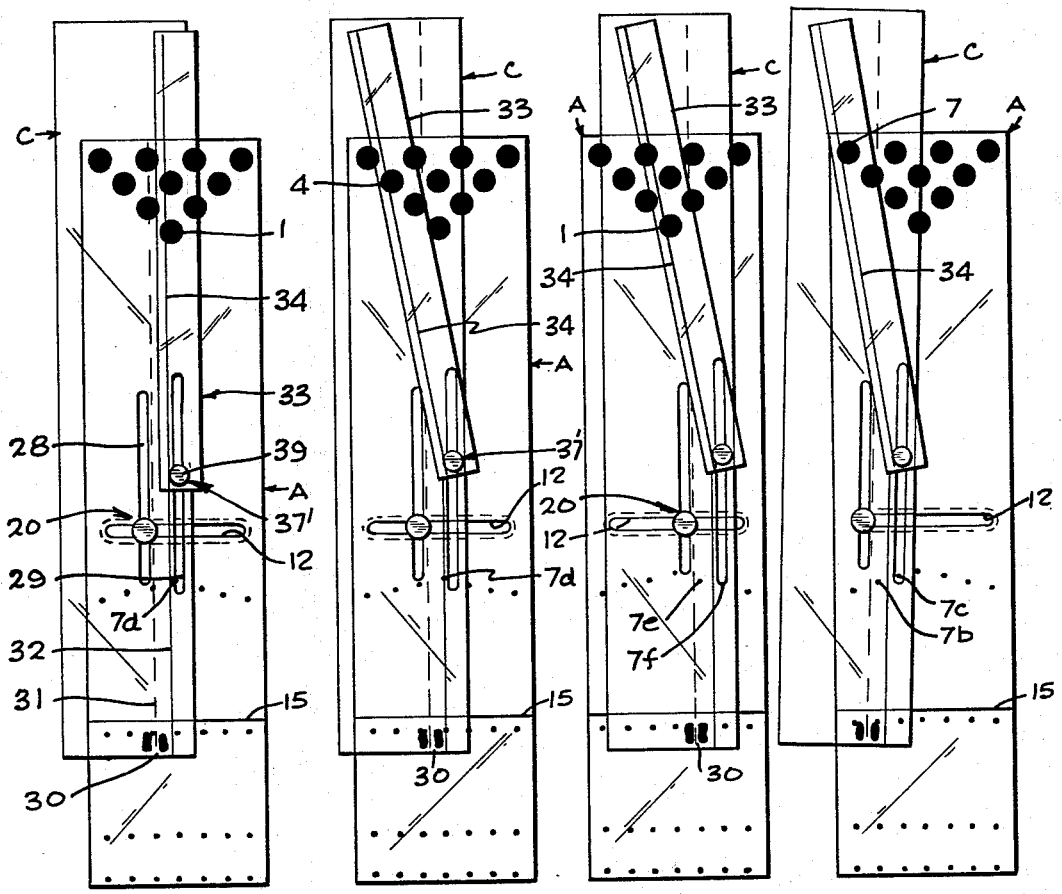
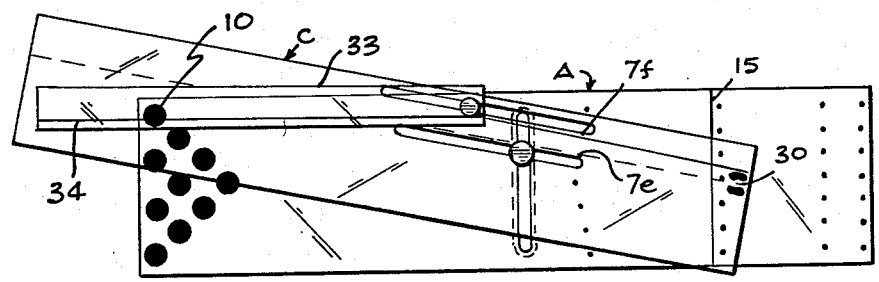
INVENTOR.
JOHN O. TOMBLIN, JR.
BY
ATTORNEY

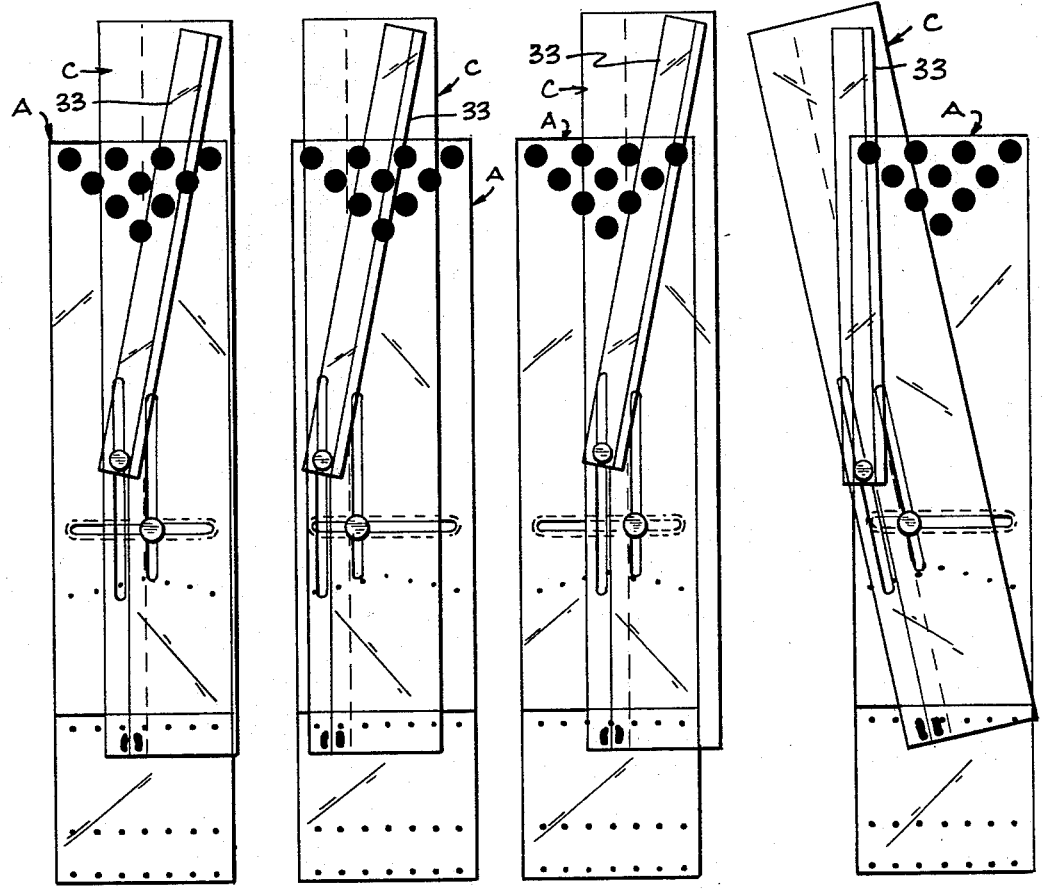

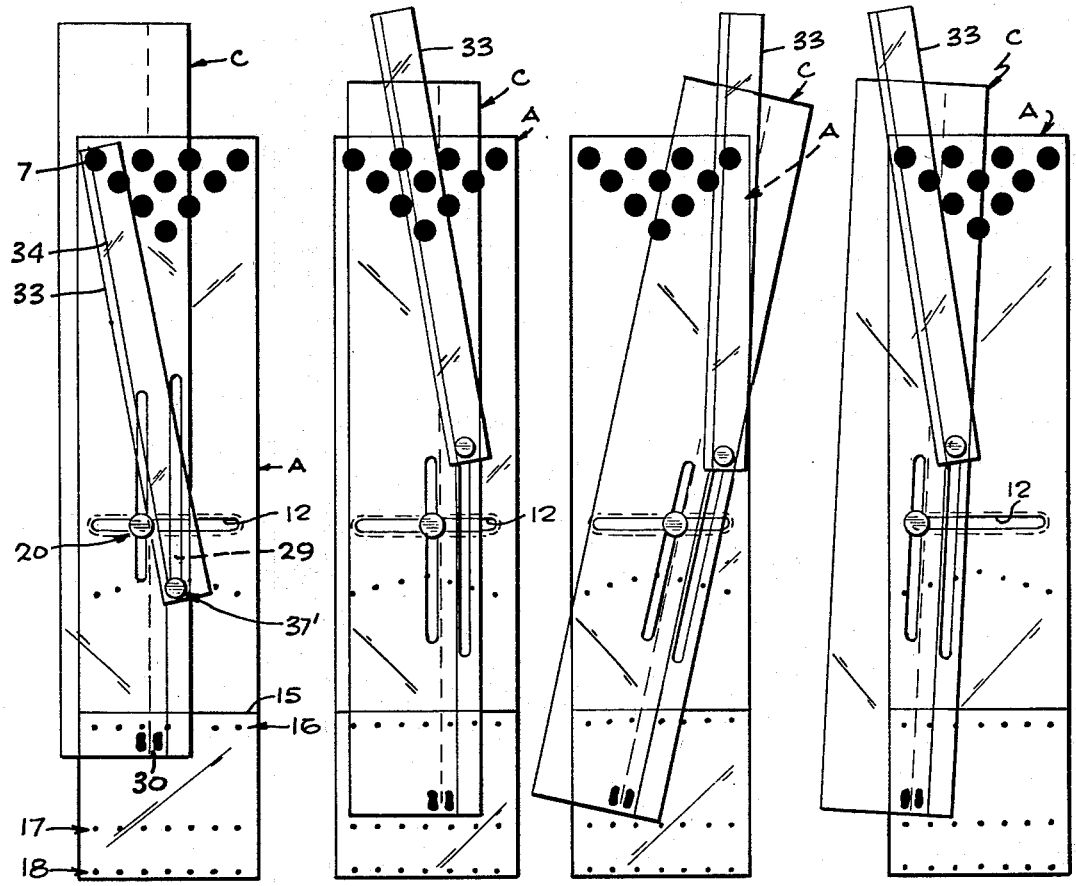

United States Patent Office 3,279,097
Patented Oct. 18, 1966

3,279,097
BOWLERS' SLIDE RULE
John O. Tomblin, Jr., 1212 Cherokee Lane,
Las Vegas, Nev.
Filed Apr. 16, 1964, Ser. No. 360,304
12 Claims. (Cl. 35—29)

This application is a continuation-in-part of application Serial No. 340,565, filed January 27, 1964.

This invention relates to a calculator and calibrator useful as a target indicating device to assist bowlers for play in 10-pin bowling alleys.

In bowling, the bowler at a starting position approaches the starting line and throws the ball at the pins set up in an array at the end of the alleys. The bowler throws the ball at a selected pin. The line of flight of the ball may be linear, that is, not curved, provided no spin is imposed on the ball, and the ball and the alley surface has a uniform character so no spin is imposed on the ball. The usual case, however, the normal throw produces a spin in one direction on the ball for right hand bowlers, which give the curvature to the left, i.e. a "hook" to the ball flight. A left hand bowler will give a "hook" to the right. The position taken by a bowler thus depends on the pin to be hit and the characteristics of his throw. He may throw from the central position of the alley to obtain a strike, or a right hand position or left hand position of the alley, or throw the ball at an angle across the alley if he is after a spare.

To assist the bowler, target marks known as "lane spots" are positioned in the alley. The bowler selects a lane spot so that, taking in consideration the curvature of the path, the ball will intersect the selected pin. The success of the throw depends on the bowler adjusting his throw to produce the required line of flight of the ball. The line of flight will vary, depending on the state of the alley. The condition of the bowler, and other conditions not entirely under the control of the bowler, will affect the line of flight. Thus, for example, if the alley has been freshly oiled, the degree of the curve will decrease and a movement of the ball, transverse of the alley, will be less than in an alley where the frictional resistance is greater than in the oiled alley.

Thus, the position taken by the bowler as he approaches the foul line, and the selection of lane spot at which he throws the ball, will depend upon the nature of the curved path of the ball which the ball will take. It will depend on the physical and psychological condition of the bowler, as well as the physical condition of the alley.

These considerations require solutions of a complicated problem in physicals which the expert bowler, through experience, has learned to solve instinctively. An experienced bowler is able to make a mental calculation, often instinctive, which permits him to relate his starting position and a lane marker at which he will throw the ball to hit his selected pin. For the relatively inexperienced bowler, they are not only difficult of solution but in most cases, are not even realized. For the less experience bowler, this is often not possible. He may not understand or appreciate how to adjust his throw, or he fails to make or retain the necessary observation to permit him to make the mental calculations which permit him to adjust his starting position, and to select the appropriate target.

My invention provides a simple device which makes the necessary calculations and selects the lane marker and the start position, which, because of the physical condition of the alley, and the physical and psychological condition of the bowler, is necessary for the curved path i.e., the hook of the ball to intersect the selected pin.

By using my invention, even an inexperienced bowler makes consciously the selection of the position, right and left, or center of the alley, in the straight or curved path throw which the conditions of the alley and the characteristics of its throw, is required for him to hit the selected pin. He, thus, does consciously what the expert does instinctively.

The device of this invention is composed of a strip which carries indicia indicative of the bowling pins and their position in the usual pin array. It carries indicia indicating the foul line and the lane spots, and may also have the approach spots usual in bowling alleys. It is thus a representation of a bowling alley.

A second strip movable over the first strip, and carrying indicia for the bowler's position, and a curved line indicating the normal curved bowling ball path i.e., its line of flight. The bowler selects a position and lane spot at which he wishes to throw the ball to hit the selected pin. The bowler sets the overlying strip so that the line of flight of the ball hits the desired pin. A calibrating shot is made from the indicated bowler position to throw the ball to pass through the array of lane spots and be directed at the selected pin. By observing the lane spot over which the ball passes, and the pin which is hit, this establishes the relationship between the starting position, the selected lane spot and the pin which the ball impacts.

These observations integrate the effect of the physical condition of the alley and the bowlers condition, which determines the path of the ball. If the pin which is hit is other than the selected pin, the number of the pin to right or left of the selected pin which is hit, is observed, and the overlying strip is adjusted so that the line of flight on the overlying strip displaced to the right or left of the selected pin, equal in distance to the displacement of the selected pin from the pin which is hit, this, then, selects the starting position, and lane marker required to hit the selected pin. Thus, the device is used to calibrate the line of flight produced by the bowler and establish the position of the bowler's feet at the inception of the throw and select a lane marker which will permit the bowler to hit the selected pin.

In order that the actual line of flight be made applicable to every condition of pin array for strike and spare, provision is made so that the selected starting position and lane marker and the direction of flight parallel to the axis of the alley, or transverse thereto, may fit the geometric properties of the alley and pin array, and the psychological condition of the bowler and the physical condition of the bowler and alley.

In another form of my device, the device is calibrated for the actual line of flight and a line of flight device positioned on the overlying strip is adjusted to indicate the pin hit from an arbitrarily selected starting position and lane marker selected in the throw which resulted in the pin hit which is observed. This device thus calibrates the unit for the actual line of flight so that from any starting position and selected lane spot, the device will indicate the pin which will be hit by the calibrated line of flight. In making the adjustment and using my invention, the bowler learns the relative relation of these factors in obtaining various pin hits. The device is thus an educational device whereby the inexperienced bowler is taught what the expert must know to become an expert bowler.

These and other objects of my invention will be further described by reference to the drawings.

FIG. 1 is a representation of one part of the device of my invention;

FIG. 2 is a representation of another part of my invention;

FIG. 3 is a plan view of a modification of the strip of FIG. 2;

FIG. 4 is a plan view of another part of the modification of FIG. 3;

FIG. 5 is a perspective view of an assembly of the strip of FIG. 1, FIG. 3 and FIG. 4;

FIG. 6 is a section taken on line 6—6 of FIG. 8;

FIG. 7 is a section taken on line 7—7 of FIG. 5;

FIG. 8 is one position of an assembly of the part shown in FIG. 1 and FIG. 2;

FIGS. 9, 10 and 11 show various positions of the device shown in FIG. 8;

FIGS. 8a, 9a, 10a and 11a show further positions of the device shown in FIG. 8;

FIGS. 12, 13, 14, 15 and 16, and 17 through 20 show various positions in plan view of the device shown in FIG. 5;

FIGS. 13a, 14a, 15a and 16a show different positions of the device shown in FIG. 12.

In FIG. 1 the strip A may be any sheet material sufficiently rigid and capable of being printed or painted with spots 1 through 10 indicating the position and the triangular array of pins usual in a bowling alley. In such array, the separation of the pin centers along a line intersecting the center of the pins in each row, is equal for all pins in the rows. Thus, pins 2 and 8 are aligned, as are pins 9 and 3. This is the condition of the actual bowling aley. The lane spots 7', i.e., 7a to 7g are arranged in an array in an obtuse triangle, equally spaced along the width of the strip. The spots 7a to 7g are aligned with pin locations 7, 4, 2, 1 (positioned on the center line of the strip A passing through pins 1 and 5 and lane spot 7d), 3, 6 and 10, respectively. The transverse slot 12, grooved at 14, on the reverse side of strip A, is positioned between the lane spots 7 and the pin locations, and extends parallel to the foul line 15 and perpendicular to the center line of the strip A. Line 15 indicates the foul line and the row of delivery spot 16 aligned with spots 7'. The spots 17 are arranged at the forward starting line, and the spots 18 are arranged at the rearward starting line. It will be observed that the strip A carries markings to simulate a bowling alley, but that the relative position of the spots and line, need not be the same as in the bowling alley.

Overlying strip A is a transparent strip B. Strip B may be made of transparent plastic or glass. It carries a vertical slot 19. The clamp 20 formed of a threaded pin 21 and a head 22, and a nut 23, passes through the slot 19 and slot 12 with the head 22 positioned in the groove 14 so that the face of the head 22 is flush with the reverse side of the strip A. The nut 20 thus clamps the strips together in any selected position of the strips with respect to each other. The strip B has markings 24 indicating the position of the feet of the bowler, and line 25 parallel to the slot 19 which indicates the line of sight. The curved line is made up of a straight line portion 26 parallel to 25 and the curved portion 27, indicates the line of the flight of the ball. As shown, this is an arbitrary line of length at least equal to the distance between the foul line and the pin position. With the feet position at the foul line (see FIG. 8) the line of flight 26 passing adjacent spot 7d, the line will intersect pin 1 for a strike.

Assume, however, that because of the condition of the alley and of the bowler, the hook is greater to the left and instead of hitting pin 1, the ball hits pin 2. If the bowler wishes to bowl from a like position behind the foul line, he loosens the clamp 20 and adjusts strip B to the position shown in FIG. 9, so that the curved line 27 passes through spot 7f, intersects the position of the pin 3. That is, the displacement of the strip B is to a distance to the right equal to the distance separating the centers of the pin 1 and 3, measured in a direction perpendicular to the center line of the alley. Thus, by taking his position behind the foul line and throwing the ball at spot 7f, he will hit the pin 1 instead of pin 3 because of the greater degree of curvature to the left of his line of flight compared with the standard line of flight indicated by curve 27.

Suppose now the bowler wishes to hit pin 6 for a spare, he may adjust the strip B to the position shown in FIG. 10 for a cross alley shot. As shown from a foot position further behind the foul line, and an angular shot between the spots 7d and 7c, and the line of flight, will hit the pin 6 instead of pin 10.

If he wishes to hit pin 7 for a spare, he may adjust the strip B as shown in FIG. 11 for a cross angle shot so that the line of flight passes through spot 7f and intersects the pin 4. Then, because of the increase curvature to the left of his actual line of flight, the ball will hit pin 7.

It will be seen that the position of the slot 12 extending between the position adjacent to a line passing through spot 7g and spot 7a, and the position of the slot 19 positioned to one side of the above center line and elongated to a degree approximating the spacing between the forward spots 17 and the lane spots 7', or to a degree sufficient to position the feet at the forward spots for parallel or angular position of strip B in respect to A, the various contingencies of pin pattern of flight paths may be taken care of. The length of the slot 19 is preferably at least equal to the distance between the slot 12 and the foul line 15.

The above description indicates the utility of the device for a right hand bowler whose curve is counterclockwise, i.e., hooks to the left. A left hand bowler tends to hook to the right. FIGS. 8a, 9a, 10a and 11a show the position for the condition corresponding to FIGS. 8, 9, 10 and 11 respectively, for a left hand bowler whose hook is one pin position to the right of the standard line of flight as indicated by the curve 27. This arrangement is obtained by reversing the strip B.

The geometry of the system for a left-hand bowler is symmetrical about the center line with that for the right-hand bowler, being a mirror image of the system for a right-hand bowler. This symmetry is evident by comparing FIGS. 8–11 with the corresponding FIGS. 8a–11a.

The left-hand bowler takes a position shown in FIG. 8a and throws the ball to pass between the lane spots 7c and 7d with the intention of hitting pin 1 for a strike. Assume, however, that he hits pin 3. He, then, shifts the strip B to the left, as shown in FIG. 9a, and, throwing the ball at the lane spot 7a, he will hit pin 1 instead of the indicated pin 2.

To hit pin 10 (FIG. 10a) or 4 (FIG. 11a) for a spare, a cross-angle shot, as shown in FIG. 11a, FIG. 10a will hit pin 4 instead of the indicated pin 7, and the right hand side of pin 10 instead of pin 6.

The bowler can select other positions to hit any pin for a spare by a similar adjustment after the calibration shot, with the line of flight curve passing through a pin displaced from the selected pin, as described above. In all of these settings, the line of flight is displaced from the selected pin by a distance measured in a direction perpendicular to the center line of the strip A equal to the separation in the same direction of the selected pin and the pin actually hit in the calibration shot.

The position of the slots 19 and 12 and their length, are designed to permit the position of the feet to be at any place behind the foul line within the boundaries of the alley so that, for a normal hook, as illustrated by curve 27, all pin positions may be hit.

It will be observed that certain pin positions with certain feet positions, for a right-hand and for a left-hand bowler with a hook greater than normal, are excluded, for the line of flight will pass outside the boundaries of the alley i.e., the strip A. The bowler in such cases must make an adjustment so as to reduce the degree of his hook in these exceptional conditions of a pin pattern to hit a selected pin for a spare.

It will be understood that, in the event the calibration shot indicates that the ball follows the normal curve, as, for example, where in the conditions of FIG. 8 or 8a, a strike is obtained, the position of the feet and the lane spot to hit any selected pin, may be determined placing the feet at any selected position and by intersecting the selected pin by the line of flight curve 27, the lane spot is chosen.

In the above forms, the bowler must remember the position of his feet, the lane spot aimed at, selected pin and the pin hit in his calibration shot in making the adjustments for his subsequent positions to hit any selected pin in any given pin array. In the form shown in FIGS. 12 through 20, this is not necessary since a memory is introduced into the system and the device is calibrated. Once the calibration adjustment is made, the device will determine the position of the feet, the lane spots and the direction of the line of flight required for the ball to hit any selected target from any selected starting position.

The device of FIGS. 5 and 12 through 20 employ the same strip A as in FIG. 1. Strip C is used instead of the strip B. It, too, is transparent and may be made of the same material as the strip B. It has a slot 28 similarly positioned to, and of extent, the same as the slot 19 and similarly extending parallel to the center line of the strip, and to one side thereof.

A second slot 29, parallel to the slot 28, is positioned between the slot 28 and the adjacent edge of the strip C. The slot 29, at both of its ends, extends beyond the ends of the slot 28. The strip C on the reverse and obverse side thereof is grooved about the slot 29. The strip carries indicia 30 for the position of the feet, a line of sight line 31 adjacent a slot 28 and a line of flight line 32 adjacent the slot 29. The lines 31 and 32 are positioned between the slots 28 and 29. The flight line 32 is made parallel to the center line of the strip C, and of a length to extend beyond the forward end of the slot 29. An angle bar 33 carrying an angle index line 34 and a bore 35, is provided.

A clamp comprised of a head 36 and a threaded pin 37 and the washer 38, and a knurled nut 39, and is employed to mount the bar 33 on the strip C with the head 36 in the longitudinal groove 40, so that the head may slide over the strip C, and for this reason, the head 36 is made of an external diameter greater than the width of the slot 28 to fit in the groove 40.

To calibrate the device, the bowler selects any position for the feet behind the foul line; selects the pin he wishes to hit and the lane spot at which he wishes to throw. Assume that he has selected the foot position and lane marker 7d and pin 1. He sets the unit as indicated in FIG. 12, with the foot position as shown and the line of flight passing through the lane spot 7c, and the angle bar positioned so that the line 34 passes through pin 1 and tightens the clamps 20 and 37'. The bowler from the selected position throws the ball at the lane spot 7c. Assume that he observes that, instead of hitting pin 1, he has hit pin 4. Without touching clamp 20, so as to leave the orientation of strips A and B undisturbed, the clamp 37' is loosened and the arm 33 is swung, as shown in FIG. 13, until the line 34 intersects the pin 4 at the point of the impact of the ball and the pin 4, in the calibration shot and the clamp 37' is tightened.

The device is now ready to integrate the effects of the bowling alley condition, and the bowlers' condition, the selected foot position, the lane spot and direction of the line of flight to hit a selected pin. Thus, for example, for a strike to hit the left hand edge of pin 1, the bowler without disturbing the clamp 37, loosens clamp 20 and the strip B is shifted as shown in FIG. 14, to the right along the slot 12 to position the line of flight parallel to the center line to pass perpendicular to the foul line 15. The positioning of the line of flight in this perpendicular position is aided by the in line positions of the lane spots, and the complementary position of the spots 17 and 18. The displacement brings the angle index line 34 to intersect pin 1 at the left hand edge of pin 1. The clamp 20 is then set.

The required foot position is thus determined and line 32 passing between the spot 7e and 7f selects the lane spot position and direction of throw at which the bowler should aim. The ball would then, following the calibration curve, will hit pin 1 for a strike.

To hit pin 7, the strip C is shifted to the left and rotated clockwise as shown in FIG. 15, until, with the feet at the foul line, the angle index line 34 intersects pin 7 at the desired portion of the pin. This selects the foot position, lane spot position between 7b and 7c. It will be observed that the slot 12 is of sufficient length to accommodate this position.

In order to hit pin 10, the strip C may be shifted as shown in FIG. 16, towards the other end of the slot 12. The strip C is rotated clockwise until the line 34 intersects the pin 10. This selects the foot position and the lane spot adjacent 7f.

It will be seen that the condition of FIGS. 15 and 16 require an angle shot. The lane spots and the angle across the alley is thus determined for a foot position at the foul line.

FIG. 17 shows the position similar to the position of FIG. 13, but with the swivel point at the lower end of the slot 29, for a hit on pin 7, showing the position of the swivel point and with foot position near the forward spot 17. From this position of the feet, and with the position similar to FIGS. 13 to 16, may also be obtained with a suitable angle of rotation of the strips. FIGS. 18, 19 and 20 are conditioned similar to FIGS. 13, 14 and 15 where the foot position for the start of the throw is near the forward mark of 17.

It will thus be seen that the length of the slots 28 and 29, and their location, permits the selection of various starting positions, pin patterns and hooks to solve the various conditions confronting a bowler.

The forms of the device is illustrated in FIGS. 12 through 16, showing a hook for the right hand bowler, may also be employed for a bowler who hooks to the left. In order to employ the same device for the solution of the problems of the bowler who is left handed, the hooks to the right, means are provided to adjust the device for this purpose. The bar 34 and clamp 37' are removed and the strip C is removed, the bar 33 is mounted on the reverse side of the strip C by means of the clamp 37', with the head 36 in groove 41, provided in the reverse side of strip C, at the slot 29.

The strip is again mounted on the strip A as in the forms of FIGS. 12–18, FIGS. 12a, 13a, 14a, 15a and 16a. FIGS. 13a–16a illustrate conditions similar to FIGS. 13–16, respectively, but for a left-hand bowler. As previously, the bowler sets strip A with the feet at any selected position, and selects a lane spot at which he wishes to throw the ball. As previously, he adjusts the strips A and B to correspond. Thus, A and B are clamped together with the feet at the selected position for a calibration throw. After the calibration shot is made from any selected foot position, and with the ball thrown at any selected lane spot, the pin hit is observed. For example, if the ball hits pin 7, with the clamp in clamping position, the angle bar is adjusted to pass through pin 7 and clamped in position. He may then, by moving the strip B over the strip A without disturbing the clamp 37, select the lane spot and foot position required to hit any selected pin, as is described for the right-hand bowler as shown in FIGS. 13a–16a.

In the previous figures, the foot position for other than cross-alley shots, has been shown to be adjacent the foul line. FIGS. 18–20 illustrates the position of the strip B for the position of the feet more closely adjacent to the forward starting spots, for those bowlers who prefer this starting position. The position and length of the slots 12, 19 and 29 thus permit the adjustment of the strip B with respect to strip A, and the angle bar 33 for the various contingencies of pin pattern, degree of hook and foot position, to hit for a strike or a spare. The device thus determines the lane spot location at which the ball should be thrown to strike the selected pin from any selected pin position. If the degree of hook, i.e., the degree of curvature, is so excessive that it will pass out of the alley, in such case the bowler, if he cannot adjust his position or select a suitable lane marker, will be taught to modify his throw to reduce the degree of curvature.

While I have described particular embodiments of my invention for the purpose of illustration, it should be understood that various modifications and adaptations thereof may be made within the spirit of the invention, as set forth in the appended claims.

I claim:

1. A bowler's slide rule comprising a strip of material, indicia on said strip of material representing a bowling lane, said indicia including a foul line, a plurality of pin positions, a plurality of lane markers spaced transversely of said strip, said positions, lane markers and foul line being spaced longitudinally of said strip, a transverse slot in said strip positioned between the foul line and the pin positions, said pin positions and said lane markers being spaced on both sides of a center line of said strip, said transverse slot extending on both sides of said center line, a second strip of transparent material, a longitudinal slot positioned in said second strip between the ends of said second strip, a feet marker positioned on said second strip between the end of said second strip and of said longitudinal slot, means to indicate a line of flight of the bowling ball positioned between said longitudinal slot and one longitudinal edge of said second strip, means passing through said slots to adjust said strips relative to each other in said slots, transversely of said center line and parallel to said center line.

2. The bowler's slide rule of claim 1, said transverse slot being parallel to said foul line and perpendicular to said center line.

3. The bowler's slide rule of claim 2, said longitudinal slot being at least equal in length to the distance between the foul line and said lane spots.

4. The bowler's slide rule of claim 1, said longitudinal slot being at least equal in length to the distance between the foul line and said lane spots.

5. The bowler's slide rule of claim 1, said means to indicate a line of flight constituting a line marked on the second strip and extending in length the distance at least equal to the distance between the foul line and said pin position.

6. In the bowler's slide rule of claim 5, said longitudinal slot being at least equal in length to the distance between the foul line and said lane spots.

7. In the bowler's slide rule of claim 5, said transverse slot being parallel to said foul line perpendicular to said center line.

8. The bowler's slide rule of claim 6, said longitudinal slot being at least equal in length to the distance between the foul line and said lane spots.

9. A bowler's slide rule comprising a strip of material, indicia on said strip of material representing a bowling lane, said indicia including a foul line, a plurality of pin positions, a plurality of lane markers spaced transversely of said strip, said positions, lane markers and foul line being spaced longitudinally of said strip, a transverse slot in said strip positioned between the foul line and the pin position, said pin positions and said lane markers being spaced on both sides of a center line of said strip, said transverse slot extending on both sides of said center line, a second strip of transparent material, a longitudinal slot positioned in said second strip between the ends of said second strip, a feet marker positioned on said second strip between the end of said second strip and of said longitudinal slot, means to indicate a line of flight of the bowling ball positioned between said longitudinal slot and one longitudinal edge of said second strip, means passing through said slot to adjust said strips relative to each other in said slots, a second longitudinal slot in said second strip positioned in said second strip between the first mentioned longitudinal slot and a longitudinal edge of said second strip, and extending parallel to the first-mentioned longitudinal slot, a third strip, a line of flight index on said third strip, means passing through said third strip and said second named longitudinal slot to angularly and longitudinally adjust said third strip in said second named longitudinal slot relative to said first and second mentioned strip.

10. The bowler's slide rule of claim 9, said transverse slot being parallel to said foul line and perpendicular to said center line.

11. The bowler's slide rule of claim 10, said first-mentioned longitudinal slot being at least equal in length to the distance between the lane spots in said foul line.

12. The bowler's slide rule of claim 9, said first-named longitudinal slot being at least equal in length to the distance between the lane spots and said foul line.

References Cited by the Examiner

UNITED STATES PATENTS

| | | | |
|---|---|---|---|
| 1,434,774 | 11/1922 | Davis | 235—89 |
| 2,800,279 | 7/1957 | Hekster | 235—61 |
| 2,942,358 | 6/1960 | Pomranz | 35—29 |
| 2,989,810 | 6/1961 | Marting | 35—29 |
| 3,012,339 | 12/1961 | Peterson | 35—29 |
| 3,081,559 | 3/1963 | Kaminsky | 35—29 |

EUGENE R. CAPOZIO, *Primary Examiner.*

HARLAND S. SKOGQUIST, *Assistant Examiner.*